United States Patent [19]
Zeeh et al.

[11] 3,736,121
[45] May 29, 1973

[54] AGENT FOR STUNTING THE GROWTH OF PLANTS

[75] Inventors: Bernd Zeeh, Ludwigshafen; Karl-Heinz Koenig, Frankenthal; Johann Jung, Limburgerhof, all of Germany

[73] Assignee: Badische Anilin- & Soda-Fabrik Aktiengesellschaft, Ludwigshafen am Rhine, Germany

[22] Filed: Mar. 11, 1971

[21] Appl. No.: 123,382

[30] Foreign Application Priority Data

Apr. 1, 1970  Germany............P 20 15 416.9

[52] U.S. Cl..................71/76, 71/92, 260/250 A
[51] Int. Cl. ............................A01n 9/22

[58] Field of Search....................71/76, 92; 260/250 A

[56] References Cited
UNITED STATES PATENTS 2,945,857   7/1960   Hammann................260/250 A

*Primary Examiner*—Lewis Gotis
*Assistant Examiner*—Catherine L. Mills
*Attorney*—Johnston, Root, O'Keeffe, Keil, Thompson & Shurtleff

[57] ABSTRACT

A process for stunting the growth of plants with substituted pyridazinium compounds.

4 Claims, No Drawings

AGENT FOR STUNTING THE GROWTH OF PLANTS

The present invention relates to agents for stunting the growth of plants and which contain as active ingredients substituted pyridazinium compounds.

It is known to use nitrogenous compounds, such as chlorocholine chloride (CCC) (cf. Biol. Chem., 235, 475 to 479, 1960) and 1-(β-chloroethyl)-1,1-dimethylhydrazinium chloride (CMH) (K. -H. Konig, Naturwissenschaften, 55, 217 (1968)) for stunting the growth of plants. However, their action is not always satisfactory.

We have now found that compounds of the formula (I)

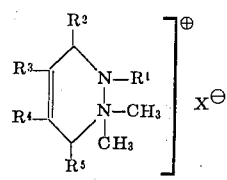

where $R^1$, $R^2$, $R^3$, $R^4$ and $R^5$ may be identical or different and each denotes hydrogen, methyl, ethyl or isopropyl, and X denotes the anion of an inorganic or organic acid, stunt the growth height of numerous plants, especially cereals such as wheat, rye, barley and oats, but also dicotyledoneae (e. g. tomatoes, vines, cotton) and various ornamentals such as poinsettia and hibiscus. The treated plants have a compact habit and a fairly dark leaf coloration.

It is the cation which determines the action of the compounds; almost any anion may be used. However, anions of phytotoxic acids should not be employed if it is only intended to stunt the growth of the plants and not to destroy them completely. Examples of suitable acids are: hydrochloric acid, hydrobromic acid, sulfuric acid, carbonic acid, nitric acid, phosphoric acid, acetic acid, propionic acid, benzoic acid, sulfuric acid monomethyl ester, sulfuric acid monoethyl ester, 2-ethylhexanoic acid, acrylic acid, maleic acid, succinic acid, adipic acid, formic acid, chloroacetic acid, p-toluenesulfonic acid, and benzenesulfonic acid.

The compounds reach the plants either through root uptake or absorption by the leaves. However, they may also be advantageously used in admixture with conventional fertilizers and plant protection agents, and other carriers. To increase the action, wetting agents may also be added. In addition to host soil and leaf treatment, it is possible to dress the seed. As a result of the good plant compatibility, the application rate may vary considerably, e. g. up to 15 kg per hectare. However, additions of 0.5 to 5 kg per hectare are generally sufficient.

The compounds, some of which are new, may be prepared by various methods. As a rule, a partially alkylated hydrazine is used as starting material and is reacted, in the presence of an oxidant, with a 1,3-diene in accordance with, for example, the following equation:

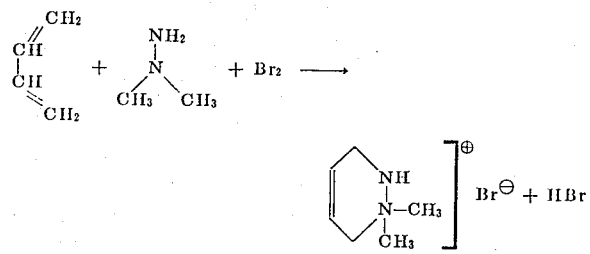

The preparation of an active ingredient is given below by way of example:

EXAMPLE 1

12 parts of 1,1-dimethylhydrazine is dissolved in 50 parts of 48 percent (by weight) aqueous hydrobromic acid and 50 parts of water. While stirring and at 0° C, 32 parts of bromine in 75 parts of 48 percent hydrobromic acid and 100 parts of water is added. The mixture is subsequently cooled to −10° C and 20 parts of butadiene is slowly added. Stirring is continued for 4 hours at −10° C. Two phases form and concentration is effected in vacuo at 40° C. The residue is recrystallized from isopropanol: 28 parts of 1,1-dimethyl-1,2,3,6-tetrahydropyridazinium bromide melting at 206° to 208° C is obtained.

The compound has the following structural formula:

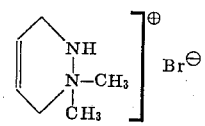

The remaining compounds are prepared analogously; examples of other active ingredients are:

EXAMPLE 2

1,1,4-trimethyl-1,2,3,6-tetrahydropyridazinium bromide, m.p.: 154° to 156° C

EXAMPLE 3

1,1,4,5-tetramethyl-1,2,3,6-tetrahydropyridazinium bromide, m.p.: 191° to 192° C

EXAMPLE 4

1,1,2,4,5-pentamethyl-1,2,3,5-tetrahydropyridazinium bromide, m.p.: 183° to 185° C

EXAMPLE 5

1,1-dimethyl-1,2,3,6-tetrahydropyridazinium chloride, m.p.: 230° C (decomposes)

EXAMPLE 6

1,1,2-trimethyl-1,2,3,5-tetrahydropyridazinium bromide, m.p.: 220° C.

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, the solution in water is suitable. However, hydrocarbons having boiling points higher than 150° C, e. g. tetrahydronaphthalene or alkylated naphthalenes, or organic liquids having boiling points higher than 150° C and having one or more than one functional group, e. g. the keto group, the ether group, the ester group or the amide group, this group or these groups being attached as substituent(s) to a hydrocarbon chain or being a component of a heterocyclic ring, may also be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e. g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e. g. kieselguhr, talc, clay or fertilizers.

In the following examples, the action of 1,1-dimethyl-1,2,3,6-tetrahydropyridazinium bromide (DMP) on various plants is shown.

EXAMPLE 7

In Neubauer dishes (glass vessels having a diameter of 11.5 cm) the cereals wheat (Opal type), barley (Breun's Wisa type) and rye (Petkuser type) were sown in a sandy loam soil which had previously been adequately supplied with nutrients. The application rates were 3, 6 and 12 mg of active ingredient per dish, corresponding to preemergence application rates of 3, 6 and 12 kg per hectare of active ingredient. The prior art growth regulators CCC (2-chloroethyltrimethylammonium chloride) and CMH (1-(β-chloroethyl)-1,1-dimethylhydrazonium chloride) were used in the experiment for comparison purposes.

The plants were continuously observed in the greenhouse for a period of 5 weeks. Emergence was normal at all application rates. After only a week differences were observed: DMP had, compared with CCC and CMH, a superior action, particularly on barley and rye. The chlorophyll content (leaf coloration) was most strongly influenced by the active ingredient according to the invention.

After 5 weeks the height of the plants was measured; the results are given in the following table. As these figures show, DMP was considerably superior to the agents used for comparison purposes.

A. Action on wheat (Opal)

| Active ingredient | Application rate kg/ha | Plant height in cm | relative |
|---|---|---|---|
| untreated (control) | | 28.5 | 100 |
| CMH | 3 | 20 | 70 |
| CMH | 6 | 17.5 | 61 |
| CMH | 12 | 16.5 | 58 |
| DMP | 3 | 19.5 | 68 |
| DMP | 6 | 18 | 63 |
| DMP | 12 | 16 | 56 |

B. Action on barley (Bruen's Wisa)

| Active ingredient | Application rate kg/ha | Plant height in cm | relative |
|---|---|---|---|
| untreated (control) | | 28 | 100 |
| CCC | 3 | 22.5 | 80 |
| CCC | 6 | 21 | 75 |
| CCC | 12 | 20 | 71 |
| CMH | 3 | 23 | 82 |
| CMH | 6 | 22.5 | 80 |
| CMH | 12 | 21 | 75 |
| DMP | 3 | 21.5 | 77 |
| DMP | 6 | 20 | 71 |
| DMP | 12 | 19 | 68 |

C. Action on rye (Petkuser)

| Active ingredient | Application rate kg/ha | Plant height in cm | relative |
|---|---|---|---|
| untreated (control) | | 23.5 | 100 |
| CCC | 3 | 22 | 94 |
| CCC | 6 | 21.5 | 92 |
| CCC | 12 | 20 | 85 |
| CMH | 3 | 21.5 | 92 |
| CMH | 6 | 21 | 89 |
| CMH | 12 | 21 | 89 |
| DMP | 12 | 21 | 89 |
| DMP | 6 | 19.5 | 83 |
| DMP | 12 | 19 | 81 |

EXAMPLE 8

70 parts by weight of the compound of Example 1 is mixed with 30 parts by weight of N-methyl-α-pyrrolidone. A mixture is obtained which is suitable for application in the form of very fine drops.

EXAMPLE 9

20 parts by weight of the compound of Example 2 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 10

20 parts by weight of the compound of Example 3 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 11

20 parts by weight of the compound of Example 4 is dissolved in a mixture consisting of 25 parts by weight of cyclohexanol, 65 parts by weight of a mineral oil fraction having a boiling point between 210° and 280° C, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 12

20 parts by weight of the compound of Example 5 is well mixed with 3 parts by weight of the sodium salt of diisobutylnaphthalene-α-sulfonic acid, 17 parts by weight of the sodium salt of a lignin-sulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1 percent by weight of the active ingredient.

EXAMPLE 13

3 parts by weight of the compound of Example 1 is intimately mixed with 97 parts by weight of particulate kaolin. A dust is obtained containing 3 percent by weight of the active ingredient.

EXAMPLE 14

30 parts by weight of the compound of Example 1 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:

1. A process for stunting the growth of plants wherein the plants or the host soil for the plants are treated with an effective, plant growth-stunting amount of a compound of the formula

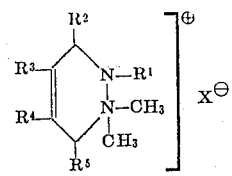

where $R^1$, $R^2$, $R^3$, $R^4$ and $R^5$ may be identical or different and each denotes hydrogen or methyl, ethyl or isopropyl, and X denotes the anion of an inorganic or organic acid.

2. A process for stunting the growth of plants wherein 1,1-dimethyl-1,2,3,6-tetrahydropyridazinium bromide is used as active ingredient.

3. A process as claimed in claim 1 wherein the host soil is treated with said effective amount of said compound.

4. A process as claimed in claim 1 wherein said amount is in the range of 0.5 to 15 kg. per hectare.

* * * * *